No Printed Specification Available
8548X
T. E. Daniels.
Wood Plane Attachment.
Patented Dec. 23, 1834.
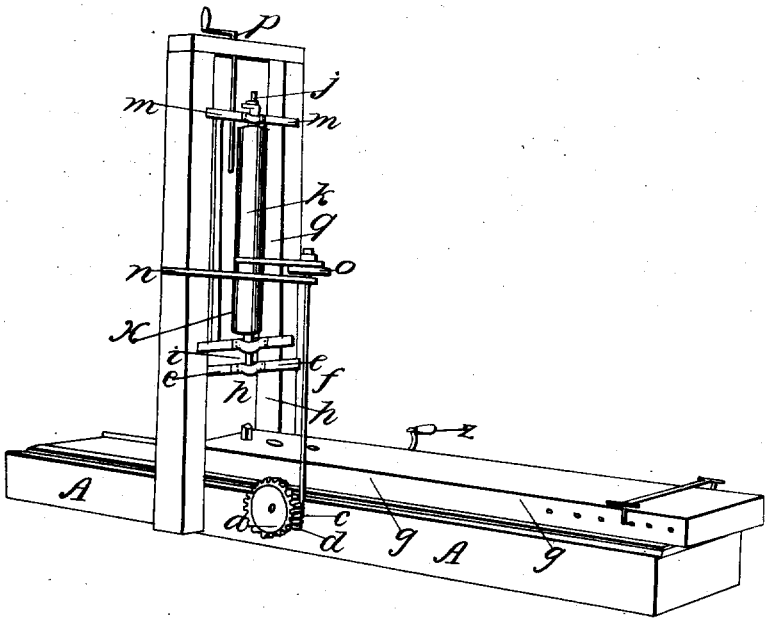
AM. PHOTO-LITHO. CO. N.Y. (OSBORNE'S PROCESS)

Thomas E. Daniels
Letters Patent

The Schedule referred to in these Letters Patent and making part of the same containing a description in the words of the said Thomas E. Daniels himself of his improvement in the method of making smooth uneven surfaces of wood by means of revolving cutters called a Planing Machine.

To all People to whom these presents shall come. Be it known that I Thomas E. Daniels of Worcester in the County of Worcester and Commonwealth of Massachusetts machinist have invented. made constructed and applied to use a new and valuable improvement in the method of Planing uneven surfaces of wood by means of a machine called a Planing Machine which is specified and described in the words following to wit. The machines now in use intended to accomplish a similar object of that which I have made are attended with this difficulty or inconvenience. The wood or stuff to be planed is required to be placed up the carriage and adjusted to the cutters by guaging or measuring. In doing this there is great difficulty in fixing both ends of the stuff in so exact a position as is often times desirable and the consequence is that the work is left imperfect and irregular. My Machine obviates this inconvenience by moving or adjusting the cutters to the stuff instead of the stuff to the cutters. Take a very thick plank of firm wood of suitable length and breadth which is for the carriage to move upon. Through this plank is a mortise large enough to receive a cogwheel which by means of a straight ratch moves the carriage to the cutters. This cogwheel is attached to a shaft resting on boxes inserted in to the plank near the edge of it. The ends of the shaft project over the sides of the plank and upon one is a cogwheel and upon the other a crank. Near the end of the shaft on which the cogwheel is placed is a rest or pedestal with a box to receive the lower end of an upright revolving shaft.

upon

Upon the lower end of this shaft is an endless screw or thread for moving the cogwheel last named. The upper end of this upright shaft is accommodated with drums or pulleys of various diameters to receive the band which turns the shaft. Near the middle of the plank which the carriage moves upon (and firmly united to the sides of the plank) are erected two perpendicular posts, connected at the top by a beam or cross bar. To one of these posts is attached a projecting arm through the end of which passes the upper end of the upright shaft. Between these two perpendicular posts is a moveable frame similar to the saw frame in a common saw mill. Through the top and bottom bars of this frame is a perpendicular revolving shaft. Attached to this shaft is a drum for the band before mentioned. Upon the lower end of this shaft which is below the bottom bar of the frame is attached the arm which holds the cutters. This arm has slots in each end to receive the cutters and accommodate them with keys or fastenings. The shaft passes through the centre of the arm and by means of the slots the cutters can be confined at convenient distances from each other. The frame which is moveable up and down is accommodated with screws by which it can be firmly confined to any required point of elevation. Through the beam connecting the two perpendicular posts passes a screw which also passes through the top bar or cross piece of the frame, with a crank attached to the upper end of it. This is for the purpose of elevating or depressing the frame to fix or set the cutters according to the work which is to be performed. The machine is put in operation by means of a band passing round the drum upon the shaft in the frame and connecting with the moving power. The carriage is fitted with dogs for holding the wood or stuff to be planed. Explanation of the Drawing. A.A. the plank or foundation of the machine. a. cogwheel. d pedestal or rest for the foot of the upright shaft g-g. upright shaft c. Endless screw upon the upright shaft. f g.g. carriage. e.e. slots in the arm.

arm i, for the cutters. h.h. cutters i. arm attached to the lower
end of the shaft j. j. shaft to which is attached the drum k.
k. drum for both bands. m.m.m.m. frame. p. screw to ele-
vate or depress the frame m,m,m,m, + o drum upon the shaft s.
q. band, x. a bar through which pass screws for confining the frame
m,m,m,m. z. crank on the opposite end of the shaft of the cogwheel
a. n. arm to support in its place the top of the shaft s. Operation
of the machine. The wood to be planed is first fixed upon the carri-
age g.g. and by means of the screw p. the cutters h.h. are set accor-
ding to the required thickness of the stuff. Their exact position
may be ascertained by measuring the distance from the top of the
carriage to the edge of the finishing cutter the pedestal d. (which
passes through the plank A,A, and turns on a pin at its centre for
throwing the endless screw c. into or out of gear) is carried to-
wards the cog-wheel a, and confined to this position by means
of a catch upon the opposite side of the machine. When the ma-
chine is put in motion by means of the band connecting the
moving power with the drum k. The drum k. revolves and
with it the cutters h,h, and by means of the band q connect-
ing the drum k. with the drum or pulley o, the upright shaft
s. and the endless screw c. revolve at the same time. The threads
of the endless screw c. turn the cogwheel a, and at the same
time the cogwheel under the centre of the carriage turns and
by means of the ratch attached to the under side of the carriage,
this last cogwheel connecting with it, the carriage is moved
towards the cutters. When the carriage has moved forward the
required distance by means of a pin upon the opposite side of
the carriage, the endless screw c. is thrown out of gear and the
carriage stops. It is then returned back to its first position
by hand, by means of the crank on the opposite end of the shaft
to which the cogwheel a, is attached. All I claim as my
invention or improvement is in moving the cutters to the wood
to be planed, & in the manner above described. In testimony
that that the above is a true specification of my said improvement I have hereunto set my hand this twenty fifth day of October one thousand eight hundred and thirty four Thomas E. Daniels Witnesses Chas. Cole Baldwin.

John Hyneman.

Elisha L. Dodd (Patented 23 Decr 1834)

1212 rds

Drawing